June 22, 1965   E. EWERS   3,190,477
METHOD FOR EXPEDITING THE TRANSPORTATION OF
CONTAINERS ON RAIL-BORNE AND ROAD VEHICLES
Filed April 10, 1961   11 Sheets-Sheet 9

Inventor:
Engelbert Ewers

United States Patent Office 3,190,477
Patented June 22, 1965

3,190,477
METHOD FOR EXPEDITING THE TRANSPORTATION OF CONTAINERS ON RAIL-BORNE AND ROAD VEHICLES
Engelbert Ewers, Kirchborchen 1, near Paderborn, Germany
Filed Apr. 19, 1961, Ser. No. 101,922
Claims priority, application Germany, Apr. 22, 1960, E 19,245
9 Claims. (Cl. 214—152)

To expedite the transportation of goods in the form of single consignments and in bulk by means of railroad and road vehicles, various methods have been devised with the object of transporting the goods in the same shipping unit from the consignor to the consignee without re-loading. The following methods may be mentioned:

(1) Use of road rollers: The railroad car is rolled on the road roller to the consignor or consignee and is transferred onto the track at the despatching or receiving railroad station.

(2) Use of large-size containers: Large-size containers of 5 tons capacity are placed on railway cars and are transferred at the despatching or receiving railway station to road delivery vehicles, which carry the container on the road.

(3) The pickaback system: Load-carrying road vehicles are transferred over a loading platform onto flat cars of the railroad and are forwarded by rail.

(4) Two-way vehicles: Vehicle bodies are used which can be placed on road or rail wheel frames and in which the rubber-tired road wheels can be replaced by flanged rail wheel sets and vice versa.

In all of these systems, their vehicles and equipment used for the above-mentioned transportation from the consignor to the consignee, the individual shipping unit is transferred at the despatching or receiving railroad station from the road to the rail and vice versa. This tendency is particularly pronounced in the system using large-size containers. The large-size container forming a shipping unit can be transferred only directly from the carrying railroad car directly to the road delivery vehicle or vice versa. It has also been exclusively the object to effect a transportation from the consignor to the consignee with the same shipping unit. It has not been recognized before that a new method of arranging the cargo according to destination is required while it is on rail and no attempt has been made to devise such method.

For this reason it has been usual so far to arrange cargo less than a carload and having various destinations by re-loading in accordance with their destinations and to arrange the cars themselves by re-forming the train or by forming new trains over the hump or double incline in accordance with destination or route.

This system of forming trains is expensive and time-consuming. The extensive shunting operations in railroad stations are the main reason for the long circulation of cars, amounting to about 4 to 8 days.

The main reason for the superiority of the motor vehicle over railroad transportation resides in that the former can perform every individual shipment freely and directly at any time and within a shorter time, compared to the above-mentioned car circulation periods, i.e. within a fraction of the time required for rail transportation.

All efforts of railroad companies to develop the transportation from a consignor to a consignee in successful competition with the motor vehicle have failed for the above-mentioned reason.

On the other hand, roadbuilding can no longer keep pace with the increasing requirement for road transportation.

Combined transportation enables a relief of the road and at the same time a greater use of the railroads which are underemployed or at least not used to full capacity.

This is only possible if a new method of arranging cargo according to destination while on rail is devised, which enables a rearrangement of the cargo without requiring a shunting of railroad cars but by transverse pushing. For this purpose the large-size container is particularly suitable. Like the large-size container mentioned hereinbefore this container is transported as a shipping unit on the road with normal load-carrying road vehicles from the consignor to the loading platform of the despatching railroad station and from the loading platform of the receiving railroad station to the consignee. The same large-size container must also be transferred from the loading platform on the load-carrying railroad car and vice versa.

In the new method of arranging according to destination, this large-size container is the basic or shunting unit in railroad operations, whereas this unit has previously been formed by the railroad car.

Based on these recognitions, the method of expediting the transportation of containers by means of railroad and road vehicles is characterized according to the invention in that containers placed on a container loading platform preferably in an outer zone of a railroad station are pre-arranged on this platform along a loading track in accordance with routes and destinations so that they can be forwarded without requiring a reformation of trains or shunting movements, whereafter said containers are transferred to platform cars movable on the loading track and combined in platform car train units or on individual platform cars, the loading surface of which platform cars is preferably on a level permitting loading and unloading operations to be performed by simple transverse movements of the container between the loading platform and the platform cars, the platform car train units or platform cars, which are confined to the railroad station, as a rule, being moved along a train which consists of container-carrying cars used to carry the container on the rail and moved into the station, to which train the containers are then transferred again by transverse movements, whereby they are arranged according to destination, to available positions on said container cars and in accordance with the routes or destinations of the individual or groups of container cars so that the container units are arranged in such positions relative to the container car train that a reformation of trains and shunting movements usually necessary for this purpose on the station and on following stations is not required.

The new method is suitably performed in such a manner that platform car train units or platform cars, which are confined to the respective station, as a rule, are moved in a receiving station along a container car train which has moved into the station, that the containers to be unloaded are transferred to said platform cars by transverse movements suitably performed by the containers combined in groups, whereafter the platform car trains units or platform cars are moved, if desired, to or along one loading platform and the containers are unloaded, preferably again by a common transverse movement. This can be effected by transferring the containers to be unloaded only to platform car train units or platform cars which are confined to the station, as a rule, and which are moved along one side of the container car train, whereas new containers to be transported by the container car train are transferred from platform car train units or platform cars movable along the other side of the container car train to container positions which are, become, or have become free on the container car train.

What has been said for the receiving railroad station applies logically to the intermediate railroad stations so that in a development of the invention platform car train units or platform cars, which are, as a rule, confined to the station, are moved on the intermediate railroad stations along the container car trains which has moved into the station, and the containers to be unloaded are transferred by transverse movements to said platform cars; in conjunction with a simultaneous or directly following continued movement of the container car train the platform car train unit or platform cars may be moved to and along a loading platform, if desired, and the containers are transferred preferably by means of a common transverse movement. The containers to be loaded, which have been pre-arranged on the platform car train units or platform cars according to routes and destinations, are transferred to those container positions of the container car train which are, become, or have become free suitably during the transfer of containers to be loaded or immediately thereafter. When a container car train is moved on an itinerary track for loading and unloading of containers and at least one platform car train unit or platform car is moved on one of the two adjacent tracks, the movement of the container car train can be continued immediately when the loading and unloading of the containers have been effected so that the desired speeding up of the traffic in general is obtained. By the transfer from the container car train to a platform car train unit or to platform cars the containers, which are suitably combined in groups, may be arranged more closely together on the platform cars as a result of movements of the platform car train unit or platform cars in accordance with the positions of the containers on the container car train. This has the advantage that the container positions available are fully occupied so that relatively few platform cars or a short platform car train unit will be sufficient and the number of platform cars of a platform car train unit may be restricted to the average number of containers to be exchanged, i.e., to a fraction of the length of the container car train.

The handling can be speeded up further if the loading of containers on and the unloading of containers from the container car train can be performed in one operation or in only few succeeding operations at the same time so that the loading unloading or re-loading of the containers are combined. Containers may be unloaded, loaded and/or re-loaded between two platform car train units and a container car train which has been moved on a track between the platform car train units; this may be effected by transverse movements of containers between the two platform car train units and the container car train. It is also possible to unload, load and/or re-load the containers between one platform car train unit and two container car trains moved on tracks parallel to the track occupied by the platform car train unit; this may be effected by transverse movements of the containers between the two container car trains and the platform car train unit. In both cases the exchange of the containers may be effected in a time sequence corresponding to the different times of arrival of the container car train or trains whereas the platform car train unit or the platform cars remains or remain on the track.

Further advantages will be obtained in that the platform car train units are freely movable adjacent to a station and container car trains can be moved on adjacent tracks as freely movable itinerary tracks.

To enable an undisturbed transfer of the containers independently of existing conditions, it is desirable to brake the platform cars before reaching their assigned positions beside the container cars of the train and to shuttle them to the assigned position beside the container car with the required accuracy. The braking and shuttling is preferably automatically controlled by sensing units which sense the position of the container cars. The assignment and positioning of the platform cars relative to the container cars can be effected to align entire car lengths or to move the platform cars to positions staggered by one fourth, two fourths or three fourths, of a car length, i.e. into registry with container positions associated in any desired manner, if the sensing unit of a platform car is provided with a four-part engaging key or four feelers. It appears also necessary that after the last platform car of resiliently connected platform cars connected to form a platform car unit has been braked and shuttled into position, the platform car train unit is stretched so that after the last platform car the last but one, last but two etc. platform cars are shuttled into positions in which they are sufficiently aligned with the associated container cars. The movement of the feelers of the platform car train unit into sensing position is preferably delayed until the last platform car approaches the container car associated with it.

To enable a common loading, unloading and/or re-loading of groups of two, four or more containers, the transverse container movements required for this purpose are performed simultaneously. To this end, rolling transverse movements of containers are performed after the containers have been lifted and before they have been lowered. During lowering, the containers are preferably automatically aligned.

Further details and advantages will be described with reference to illustrative embodiments of the invention shown in the drawings as follows.

In the drawings.

*Station and platform layout*

In FIGS. 1 to 4, numerals 1, 2 designate the through tracks whereas numerals 3 to 7 designate the sidings parallel to these through tracks. It may be assumed that a container car train 8 has moved on track 3 and is to be subjected to predetermined handling operations at this station. The term "handling operations" includes the delivery and reception of the containers, which are either to be arranged by destination at this station or to be transferred to the road and vice versa. For this purpose the platform car train unit 9 has moved into track 4. As it is apparent from the position of the locomotives indicated by double lines, the platform car train unit 9 has been moved initially to the container car train 8 so that the platform cars of train 9 are aligned with the last container car group of container car train 8 by a positioning operation which will be explained in detail in FIGS. 10 and 11. It is further assumed that the last container car group of the container car train 8 carries already the containers which are to be transferred onto the road at the station shown in FIGS. 1 to 4. By means of simple transfer means, which will be described with reference to FIGS. 13 to 26, the platform car train unit 9 receives the container. Then the platform car train is shuttled over the set of points 10 to the stationary platform and back.

Figure 1:
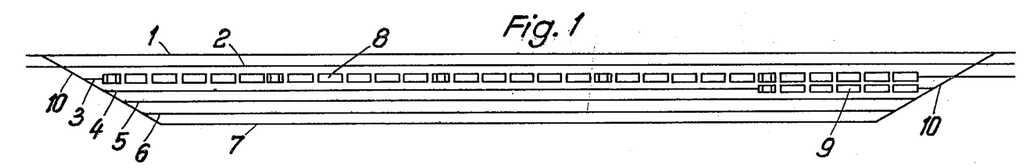
FIGS. 1 to 4 are diagrammatical views of the track arrangement of a railroad station with a platform car train in different positions.
Figure 2:
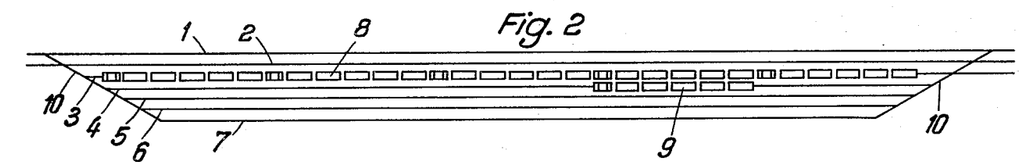

FIG. 2 shows the platform car train unit 9 in another position beside the container car train 8, more particularly beside its last but one group of cars.

Certain operations on the stationary platform and a subsequent shuttling movement of the platform car train unit from the stationary platform to the position shown in FIG. 2 have been performed before. These operations include the following: The containers to be forwarded by rail with the container car train 8 have been placed by load-carrying road vehicles on the stationary platform in the outer zone of the station. On this platform the containers have been pre-arranged according to destination and route and placed at the track-side edge of the platform with the aid of lift transfer trucks in a position for the transfer to the platform cars. The arrangement of the containers corresponds to the reported free positions of the respective (here the last but one) group of cars of the container car train 8. The platform car train unit has received these containers in a combined transfer movement (group movement) without change in position and has then moved over the set of points 10 to the track adjacent to the container car train to assume the position shown in FIG. 2. The containers to be loaded are then in registry with the free positions on the container car train and can be transferred, again in a combined group movement, to be finally forwarded by rail by the container car train 8.

Figure 3:
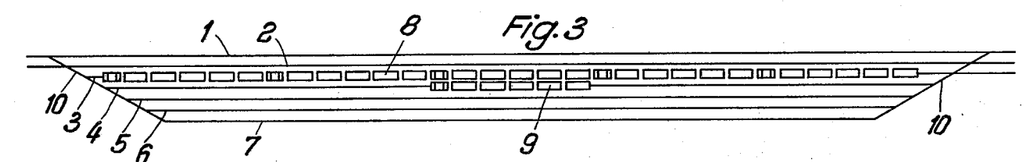

In FIG. 3, the platform car train unit is arranged beside the last but two group of cars of the container car train 8. This follows the operations described herebefore with reference to FIG. 2. The containers received from the road by the platform car train unit by way of the stationary platform have been transferred by said unit to the last but one group of cars of the container car train. The platform car train unit has moved its container positions that have become free beside the last but two group of cars and has again aligned its individual pltaform cars with the container cars of the third group to receive from the same the containers to be unloaded onto the road or to be re-loaded to other container car trains. Since all containers positions on the platform cars were free, the transfer of the containers to be unloaded or re-loaded from the last but two group of cars is combined in one group transfer.

Figure 4:
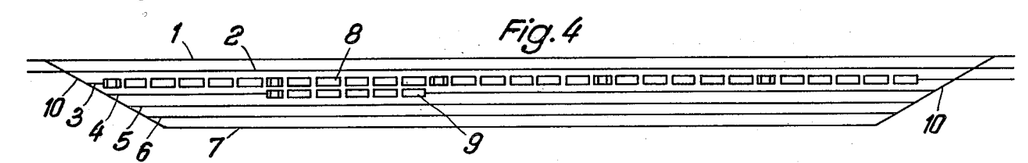

FIG. 4 shows the platform car train unit in alignment with the last but three group of cars of the container car train (this is the second group of cars behind the locomotive). As a freely chosen example the platform cars receive again the containers to be unloaded or re-loaded from the second group of cars as far as free container positions are available. As the free container positions on the platform cars are not all in alignment with the containers to be unloaded or re-loaded, the transfer is successively effected in two or more smaller groups.

The four operations shown in FIGS. 1 to 4 are simplified for the sake of clarity and represented as unmixed model operations. In fact, the operations are combined in several respects. The delivery, removal and transfer of the containers are effected more or less simultaneously within and between the individual groups of the same container car train or between several container car trains. Depending on the previously received report on the free container positions of the container car train or the positions of the containers to be unloaded and re-loaded from this train, the platform car train unit will begin with the delivery or reception of the containers and will perform the exchange of containers of the car groups in a sequence which is not chronological but varies in such a manner as to enable the combination of the containers in groups and consequently the optimum utilization of the platform cars and the shortest handling time for the container car train. Besides, the platform car train unit may assume, if required, a position relative to one of the groups of cars not only in registry with entire cars but also with parts of cars corresponding to the container positions (one fourth to four fourths of the car length). The division and sequence of the transfer operations to be selected to ensure an optimum utilization of the platform cars and the shortest handling time for the container car train are determined before in accordance with the previously reported loading plan. The same loading plan will also determine, as has been mentioned hereinbefore, the positions of the containers to be loaded at this station along the track-side platform edge. These positions will be unchanged during the transfer from the stationary platform to the platform train unit and from the latter to the container car train (only one group movement) or be changed by a division of this transfer to the container car train into a plurality of transfer operations.

The frequency of the shuttling movements of the platform car train unit between the stationary platform in the outer zone and the respective container car train (on the adjacent track) is reduced to a minimum if the transfers of the container units to be despatched from and received at the station are combined for two or more container car trains, if possible, whereas the containers to be re-loaded are either moved between container cars of car groups of the same train having different destinations or are transferred by the platform car from one container car train to another without a shuttling movement to and from the stationary platform. The re-loading of the containers is either effected between two container car trains which are at the station at the same time and arranged on the two tracks adjacent to the platform car train unit, or between two and more container car trains arriving in succession, in which case the containers to be re-loaded are kept on the platform cars until the next train having their destination arrives, whereas they are not shuttled to and from the stationary platform.

The stationary platforms mentioned hereinbefore perform two or even three functions.

(a) The containers are received from the road vehicles and transferred to the platform cars on the stationary platforms and vice versa (transfer operation).

(b) The containers to be transferred to the rail are pre-arranged on the stationary platforms in accordance with the route and the loading plan of the individual groups of cars of the associated container car train (function of arranging for destination).

(c) Containers which are to be re-loaded from one container car train to a subsequent container car train and which cannot be kept on the platform cars until the subsequent train arrives are temporarily deposited on the stationary platforms and re-arranged if desired for adaptation to the loading plan of the receiving container car train.

As the platform car train unit provides for the transfer of the containers to be loaded and unloaded at the station between the stationary platform, which must always lie in the outer parts of the station in order to be accessible by road, and the track on which the container car train is arranged, which may be any desired siding within the inner zone of the station, the layout of the loading platforms in the outer zones of the station is suitably such as to facilitate the access by road and to enable the shortest shuttling movement of the platform car train between the container cars and the loading platform.

The shuttle movements of the platform car train must always be performed over the busy sets of points. For this reason it is particularly desirable to avoid shuttle movements involving a change in directions at the sets of points.

Figure 5:
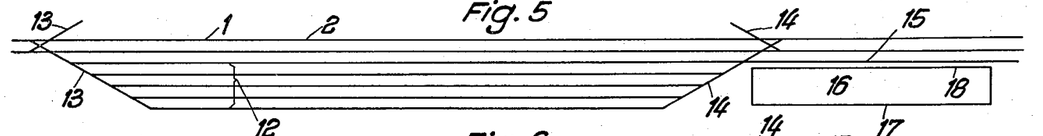
FIGS. 5 to 8 illustrate several forms of platforms with different arrangements of the stationary platforms.

FIGS. 5 to 8 show a number of examples of the layout of the above-mentioned stationary platforms. FIG. 5 shows a track system comprising the main through tracks 1, 2, five sidings 12, and the two sets of points 13, 14 at both ends of the station. The drawing shows further a pull-out track 15 connected to the plast protective point immediately before the main through tracks. In the normal track layout of a station this pull-put track extends, as a rule, over the hump or double incline. In the present case it extends beside the loading platform 16. The arrangement of the loading platform 16 adjacent to this pull-out track 15 reduces and simplifies the shuttle movements of the platform car train because the change in direction and the double movement over the set of points are eliminated. In connection with the above-mentioned example of the arrangement of the platform 16 it is emphasized that the pull-put track 15 is accessible from all sidings.

Figures 6, 7, 8:
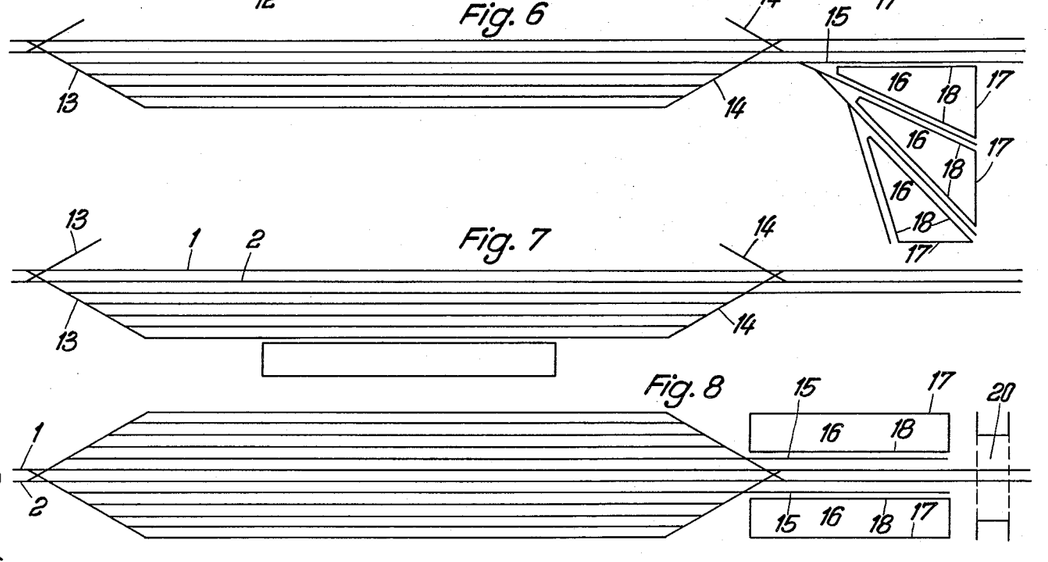

FIG. 6 shows three loading platforms adjacent to tracks joining the above-mentioned pull-out track 15. This layout complies also with the requirement that each track beside a loading platform must be reached from all sidings in a shuttle movement over the set of points.

In FIG. 7 the loading platform is disposed at the wide side of the station. This arrangement is usual in most stations. If a re-arrangement or extension of the existing station installation is not desired, the platform car train unit would have to perform its shutttle movement with a change in direction and two passes over the set of points. The increased use of the set of points would be a disadvantage.

FIG. 8 shows a double-sided station. As in FIG. 5, the loading platforms are arranged along the pull-out tracks. In accordance with the higher capacity, the tracks of the station and the loading platforms are double-sided. In stations having an even larger capacity the same layout of the two pIaforms as shown in FIG. 8 would be selected also for the other end of the station. In this case the transfer from and to the road will be effected on four loading platforms, pairs of oppositely arranged platforms being connected by an underground road below the main through tracks to enable an off-level road traffic.

The containers are transferred on the stationary platform 16, the dual or treble function of which has been described hereinbefore, the containers to be loaded or unloaded on the station are finally transferred from rail to road and vice versa. Thus, the loading platform affords a connection between rail and road but does not enforce a merger of the operators of both types of transportation.

The access road extends along the boundary edges 17, to which the load-carrying road vehicles move with their longitudinal side to place their containers on the loading platform just as the platform cars do at the track-side edges of the platform.

All movements of containers on the loading platform, including the transverse movements between the road-side and track-side edges of the platform as well as the movements for pre-arranging the containers according to their destination are performed by lift transfer trucks, preferably of the battery-operated type. The operation of pre-arranging the containers according to destination comprises the grouping of the containers according to destination and the arrangement of the containers in a row so that they are received without change in arrangement by the platform cars according to the reported loading plan of the container car train and are transferred to the latter. This is effected by placing the containers at the track-side edge of the loading platform. As a rule, the same lift transfer trucks directly receive the containers from and transfer them to the road vehicles unless other transfer means are used, mainly in the case of larger differences between the level of the vehicles and the platform.

*Platform car and container car trains*

Figure 31:
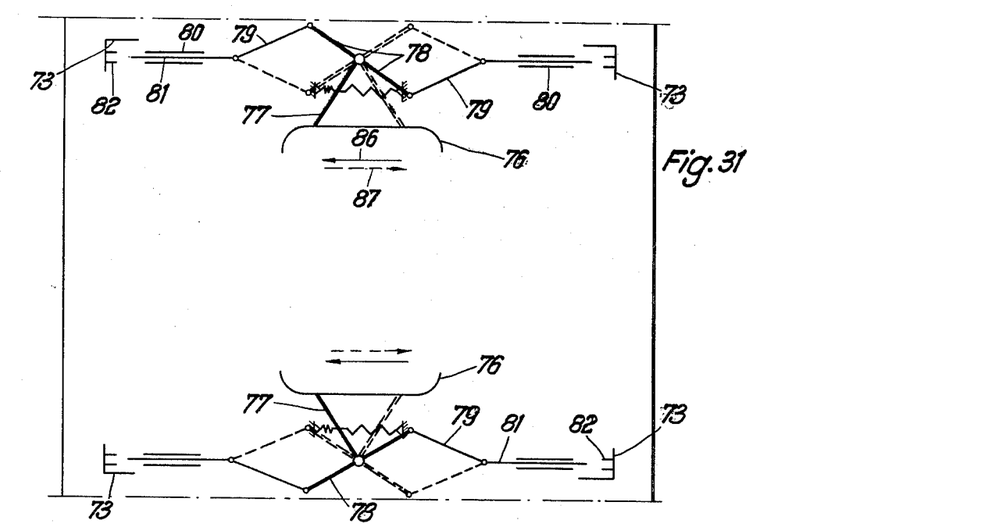
FIG. 31 is a diagrammatic view showing the means for locking a container on the container car, in locking position.
Figure 32:
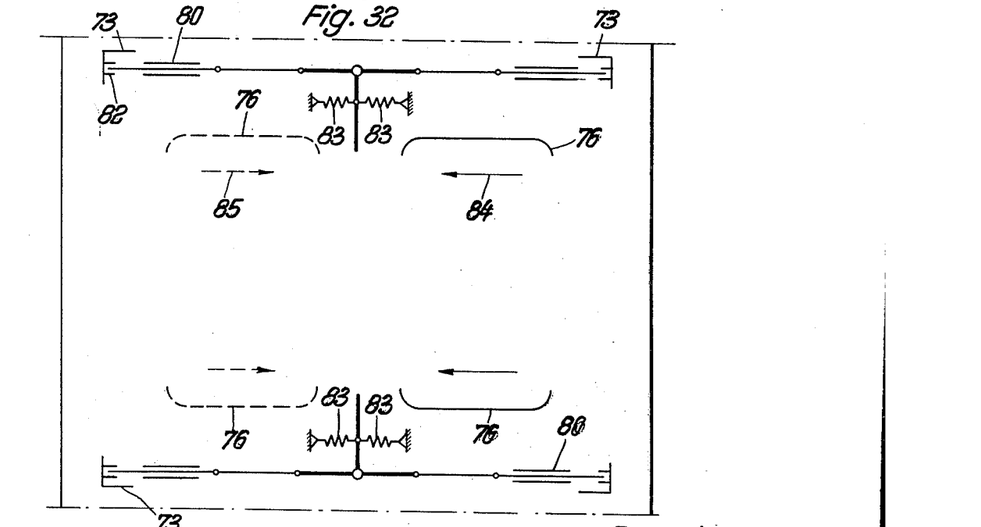
FIG. 32 shows the same means in release position.

To ensure a safe transfer of the containers from the stationary platform by the transfer means of the platform cars, individually or in one or more groups, the containers must be placed at a uniform distance from the track center of the platform car track and in positions evenly spaced from each other and corresponding to the container positions on the platform cars. For this purpose, corner retainer fitting angles serving as centering angles of the same design as those on the container cars and platform cars are arranged on the platform area adjacent to the track (see FIGS. 29 and 30 and the description thereof), but without locking means as shown in FIGS. 31 and 32.

All transfer movements of the containers and pallets from and to the container cars of the train and from and to the platforms are performed by transfer means, which are anchored on the platform cars and can be extended on both sides transversely thereto.

Thus, the platform cars are the main elements for all transfers of containers within the station, including transfers between the platforms and the container cars of a train, on the one hand, and between container cars of different trains or groups of cars of the same train, on the other hand. For this purpose the platform cars must be capable of moving freely and independently on all tracks throughout the station area.

To this end, standard cars of the same length as the container cars are used and are coupled to form short train units and drawn by a small switching locomotive (hereinafter referred to as a platform car locomotive).

To ensure a safe performance of the transverse transfer movements of the containers, each platform car must be moved as accurately as possible into registry with the container car or platform area to be associated with it. Since a train will always be coupled with draw hooks of different lengths and when moved into the station and braked will be partly stretched and partly compressed owing to the unequal braking of its cars, the container cars to be served by the platform cars will be unevenly spaced from each other, as a rule. To enable nevertheless the alignment of each platform car with the associated container car, the train formed by the platform cars must be made sufficiently resilient by the provision of graded spring boxes between the draw hooks according to a certain differentiating system so that each platform car can oscillate to a sufficiently close alignment.

This differentiating system will be explained with reference to FIGS. 9 to 12.

Figure 9:
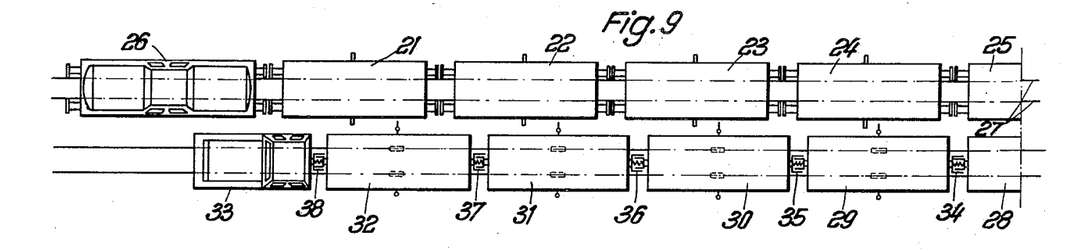
FIG. 9 shows the position of the platform car train unit before it is stretched and immediately before the alignment of the individual platform cars with the container cars.

FIG. 9 shows five container cars 21–25 of a train or groups of cars drawn by the locomotive 26 and waiting on any desired siding 27 of the station into which it has moved to be served by the platform cars, i.e. to have containers and pallets exchanged.

The platform car train unit pulled forwardly at creeping speed on the adjacent track consists, e.g., of five platform cars 28–32 and the small platform car locomotive 33. Graded spring boxes 34–38 suspended between the draw hooks of the platform cars have a relatively long spring deflection and their spring forces correspond in each case to the resistance to rolilng of the following cars. For instance, the spring box 34 in FIG. 9 has, e.g., a spring force of about 100 kg. to draw the car 28. The spring box 35 has a spring force of 200 kg. to draw the two cars 28 and 29. The spring 36 has a force of 300 kg. to draw the three cars 28–30 etc.

It is also shown in FIG. 9 that each platform car, measured at the draw hook, is shorter by about three to five centimeters than the container cars. To align its cars, the platform car train unit is to be stretched even when the container car train is compressed. Owing to the grading and careful matching of the draw hook spring boxes with the resistances to rolling of the following cars and owing to the long spring deflections an overloading of the platform car locomotive 33 by the stretching of the train during alignment of the platform cars 28–33 etc. is prevented. On an average, the tensile force of the spring box 38 remains in an order of magnitude of 500 kg. when five cars are attached behind it. Over stressing of the exactly calibrated and graded spring box is prevented by a stop arranged to limit the spring deflection to the permissible elongation.

Figure 10:
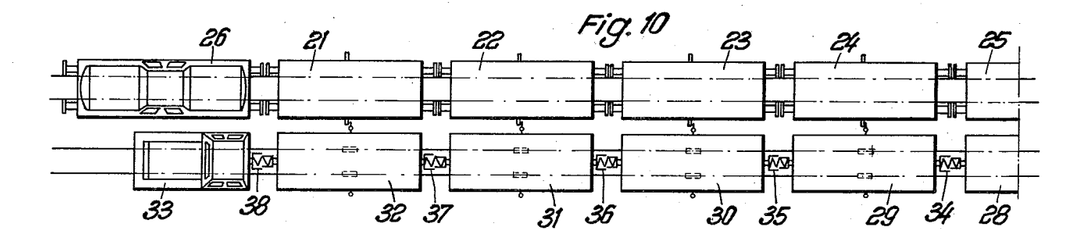
FIG. 10 shows the same platform car unit in stretched position; all platform cars have been aligned with the container cars.

In FIG. 10, all platform cars 28 to 32 have been aligned with the container cars 25–21. The short platform car train 28–32 is stretched.

Figure 11:
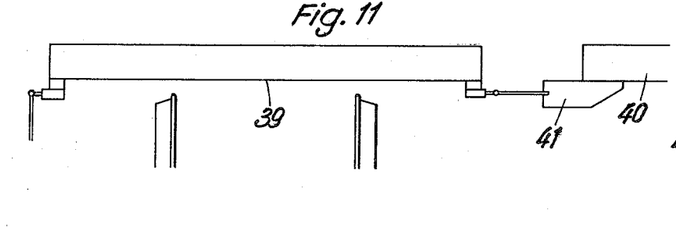
FIG. 11 is a transverse sectional view showing a container car and the platform car associated therewith.
Figure 12:
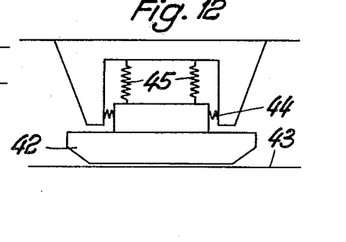
FIG. 12 shows a rail-adhering brake and the means for suspending it from the platform car.

The aligning of the platform cars is initiated by release feelers (FIG. 11) and performed by the application of rail-adhering brakes (FIG. 12). Both operations are individually and independently performed for each platform car. They are pre-controlled by a central control station on the platform car locomotive.

FIG. 11 is a transverse sectional view showing the contour of the platform car 39 on the left and of the container car 40 on the right. The release feeler 41 is swung up to initiate the aligning by the application of the rail-adhering brake and releases the rail brake when the feeler engages the container car 40 to be served. Since the release feeler 41 is divided into four parts along the length of the car, the container exchange position of the platform car 39 can be staggered relative to the container car 40 by ¼, ½ or ¾ if all platform cars are similarly staggered. Although the platform car train is pulled forward at creeping speed immediately before the desired alignment begins, the remainder of the kinetic energy of each car must be dissipated without a disturbance of the exact alignment by inaccurate braking or even slipping. for this purpose a rail-adhering brake is used, which is applied in conjunction with a shuttle movement of the car. This is shown in FIG. 12. The release feeler 41 of FIG. 11 causes the rail brake 42 of FIG. 12 to be magnetized by electric power to adhere firmly to the rail head 43 whereas the remaining kinetic energy of the car is absorbed by the horizontally extending buffer springs 44 acting in the direction of travel. The car shuttles to a standstill within the spring deflection and is retained in this position by the rail-adhering brake until the containers have been exchanged. Then only is the magnetizing current switched off and the rail brake is lifted by the vertical holding springs 43.

*Transfer equipment*

The containers and pallets are to be transferred from the rail-borne vehicle to the rail-borne vehicle or to the loading platform and vice versa transversely to the direction of travel and the longitudinal direction of the vehicles. To adapt such movements to the operating conditions of railroads, three important requirements must be fulfilled:

(1) During the transportation by the train, the containers and pallets must be anchored on the container cars so as to be stable and unable to slip. On the other hand, they must automatically unlock and lock themselves to perform the transverse transfer movement. The simple and reliable means to ensure stability and automatic unlocking and locking are four corner retaining fitting angles provided according to FIGS. 29 and 30 on the container cars and on the station platform areas adjacent to the track. The containers are lifter out of these corner retaining fitting angles at the beginning of the transverse transfer movement and are lowered within the same when the transverse movement has been completed. The transfer of the containers is thus a combined lifting and translational movement.

(2) To perform the transverse transfer movements of the containers reliably and in a simple manner, additional means to bridge the gap between the inside edges of the rail-borne vehicles must not be used. Only the elimination of such means will permit a fully mechanized and fully automatic performance of the transverse movements of the containers and the simultaneous performance thereof by any desired number of containers. The essential minimum of motive mechanism must be combined in a self-contained unit. The movement across the free gap without bridge means is enabled by a division of the transverse movement on the transfer means in two parts.

(3) The reliability of the transfer of the containers must not be affected by deviations of position in all three dimensions, which deviations are inevitable at least to a small extent. For this reason, no use is made of transverse guide rails, rail connectors and the like. Instead, all parts of the transfer means, and particularly its carrying rollers, are of strong design and have large dimensions. The minimum diameter required for the rubber-tired carrying rollers is 350 mm. The ground clearance of the containers and pallets is about 400 mm.

Figure 13:
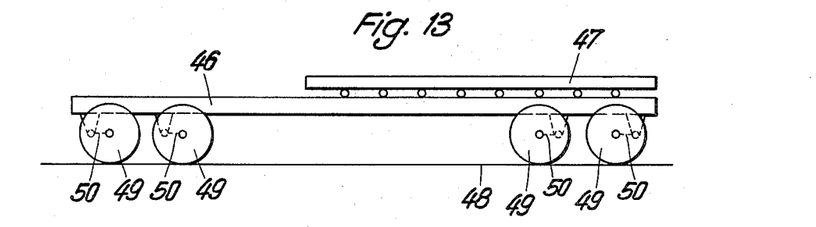
FIG. 13 shows a wheeled platform in position of rest, without container.
Figure 14:
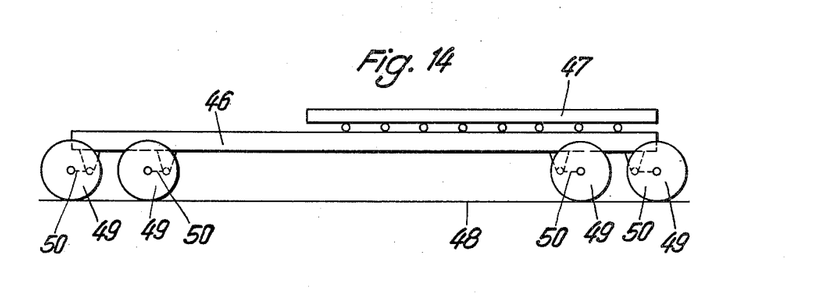
FIG. 14 shows the same wheeled platform in transfer position.
Figure 15:
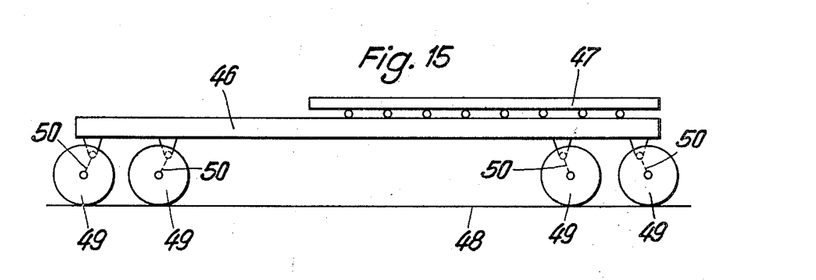
FIG. 15 shows the same wheeled platform in raised position.

FIGS. 13 to 15 show diagrammatically the contour of a wheeled platform 46, on which the rolling slide 47 of the transfer means is movable. These views are taken in the longitudinal direction or direction of travel of the platform car, on which the transfer means is anchored. The wheeled platform 46 is eccentrically supported at each of its two ends by two or four or more pairs of carrying rollers 49. By a rotation of the eccentric members 50 the pairs of carrying rollers 49 can be swung inwardly (retracted position shown in FIG. 13), outwardly (extended position shown in FIG. 15) and downwardly (lifted position shown in FIG. 15) before, during and after the transfer movement. In the retracted position shown in FIG. 13, the wheeled platform 40 is disposed in position of rest within the profile of the platform car 48. The length of the path of the wheeled platform 46 is exactly adapted to the width of the profile of the car 48.

By the provision for the extended position of the carrying rollers shown in FIG. 14, the profile-limited bridging span of the transfer means and with it the largest possible gap between the inside edges of the cars is increased.

To assume the lifted position, which is shown in FIG. 15 and in which the carrying rollers are swung down, the platform frame with the container or pallet is lifted from the car floor and is lifted from the corner retaining fitting angles, which are unlocked at the same time.

The rolling slide 47 movably mounted on the wheeled platform frame and shown in FIGS. 13 to 15 has a length which is about one half to two thirds of the length of the frame of the wheeled platform 46 and is movable on the latter toward both sides to such an extent as is compatible with the stability of the slide when carrying a container.

The sequence of the phases of movement whereby the two-part transfer means transfers the container or pallet from one rail-borne vehicle to another is shown in FIGS. 16 to 21. In all said figures, the contour of the platform car 48 with the transfer means initially anchored thereon is shown on the right and the contour of a container car 51 is shown on the left. Thus, the transfer of a container from the container car 51 to the platform car 48 is shown.

Figure 16:
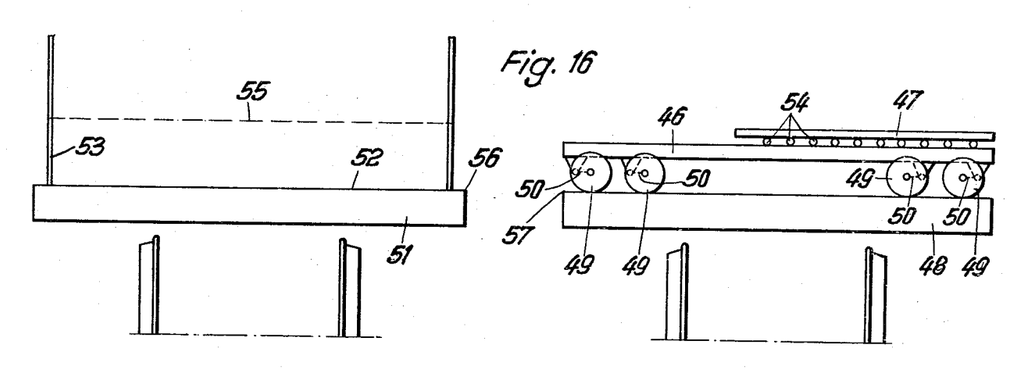
FIGS. 16 to 21 show the operation of transferring the wheeled platform with container in successive phases.

In FIG. 16 the transfer means is in its initial position or position of rest, in which it is disposed within the profile. To remain within the profile, the carrying rollers 49 are swung inwardly (retracted position). From the initial position the unloaded wheeled platform 46 is moved until its temporarily unsupported two or more double pairs of carrying rollers 49 have reached the opposite edge of the container car. This edge is rounded to facilitate the riding of the rollers thereon. During the movement of the temporarily unsupported two pairs of carrying rollers 49, the wheeled platform 46 is guided and part of its weight is supported by two stationary resilient guiding and carrying rollers at the inside edges of the platform cars, as will be explained with reference to FIGS. 22 and 23. These guiding and carrying rollers guide special-profile rails of the wheeled platform, as is shown in front and side elevations in FIGS. 22 and 23. At the same time, the eccentric members 50 are rotated to swing all pairs of carrying rollers 49 out of the retracted position in order to increase the bridging span. As the movement of the wheeled platform 46 is continued, its transferred pairs of carrying rollers 49 roll on the floor 52 of the opposite container car 51 beyond the center of the vehicle and the platform 46 moves below the container or pallet 53 until a stop is reached.

Figure 17:
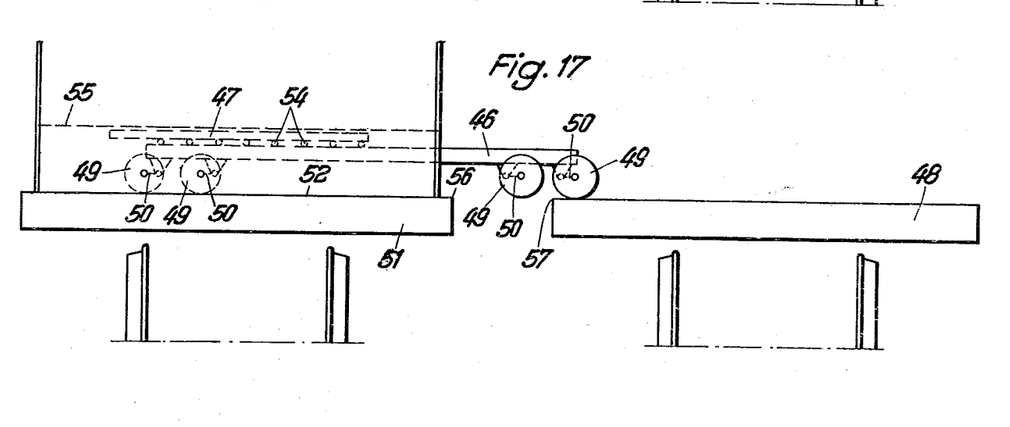
Figure 18:
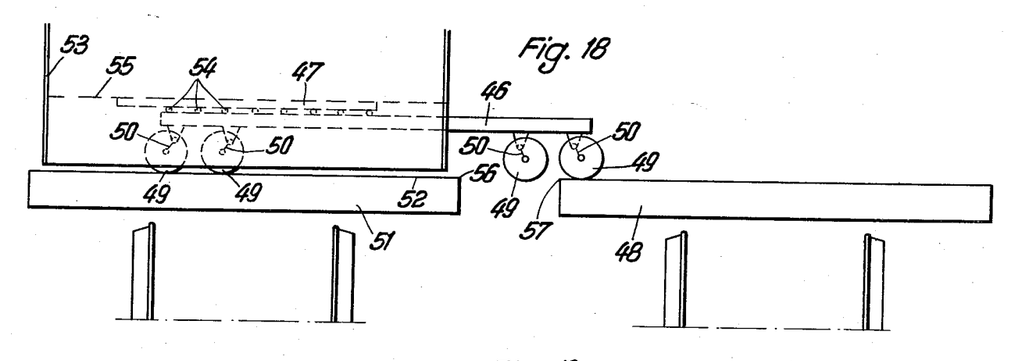

During the outward movement of the wheeled platform, the slide 47 carried by rollers 54 is moved on the platform 46 in the same direction to the end position on the other side and assumes then the central position on the container car 51 and below the container 53. This position assumed before the lifting of the container is shown in FIG. 17. By an inward rotation of the eccentric members 50 associated with the carrying rollers, the wheeled platform 46 and the rolling slide 47 are first lifted and forced against the container bottom 55, whereafter the container 53 itself is lifted out of corner retaining fitting angles, which will be described hereinafter. This phase is shown in FIG. 18. During the subsequent return movement of the wheeled platform 46, the rolling slide 47 carrying the container 53 is moved back on the wheeled platform 46 to its initial position at the right-hand end of the wheeled platform. The rolling slide 47 with the container 53 assumes a central position on the platform car 48 as soon as the outermost pairs of carrying rollers 49 of the wheeled platform 46 are just about to reach the inside edge 56 of the floor 51 of the container car. The wheeled platform may be temporarily supported only by these outermost pairs of carrying rollers, which are the last to leave the container car, because the center of gravity of the weight of the container has previously been shifted to the platform car by means of the rolling slide. The container has then reached a central position on the platform car 48 and is disposed within the profile thereof and is lowered before the above-mentioned pairs of carrying rollers 49 leave the edge 56 of the container car 51 and are now unloaded and unsupported until they are placed on the car edge 57 and return to the initial position. During the above-described double movement of the wheeled platform 46 and the rolling slide 47, the eccentric members 50 associated with the carrying rollers are swung inwardly to some extent to a slightly inwardly directed position and are swung in entirely only when the container is to be set down within the profile of the platform car (retracted position).

Figure 19:
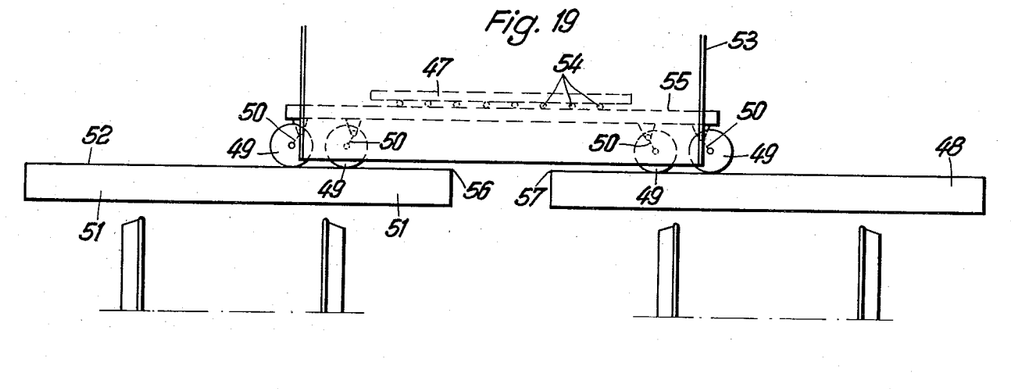

The several phases of these movements are shown as follows:

In FIG. 19 the wheeled platform 46, the slide 47 and the container 53 are in the middle between the container car 51 and the platform car 48.

Figure 20:
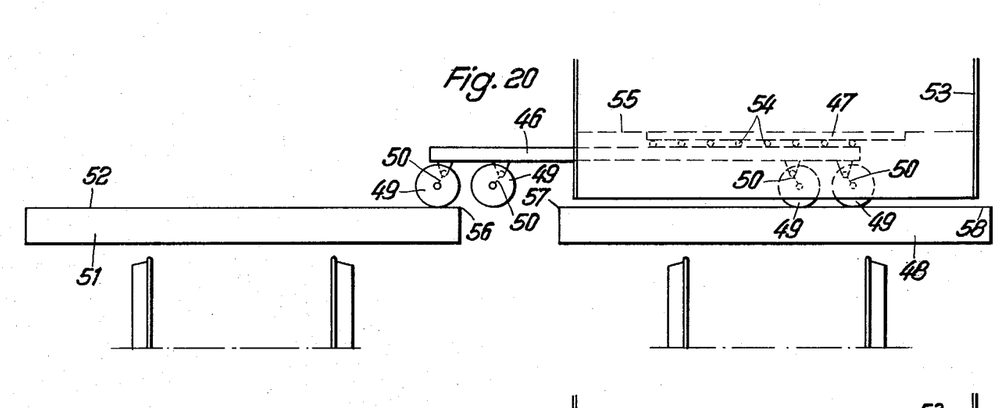

In FIG. 20 the rolling slide 47 with the container 53 is already at the center of the platform and within the profile thereof but is still lifted. The outermost pairs of carrying rollers 49 of the wheeled platform on the left are disposed slightly to the right of the inside edge 56 of the container car floor 52 before they leave the container car 51.

Figure 21:
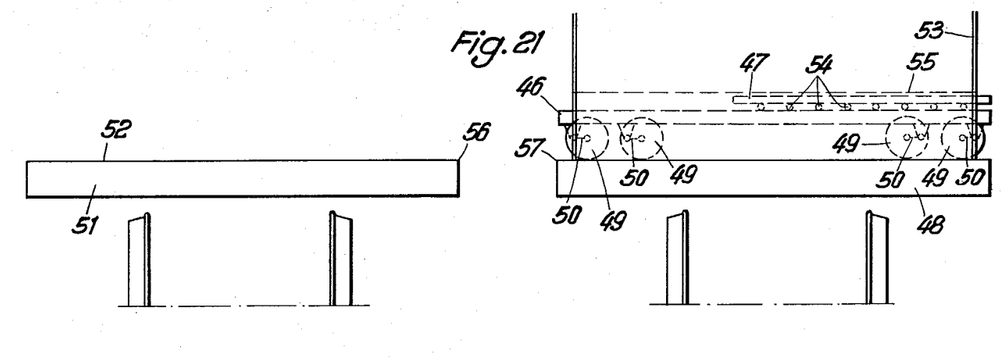

In FIG. 21 the container 53 has already been set down. The wheeled platform 46 and the rolling slide 47 are in initial position.

Between the two phases shown in FIGS. 20 and 21, the four or more pairs of carrying rollers have been swung inwardly to the retracted position and the container has been lowered within the profile of the platform car. The two extreme pairs of carrying rollers on the left have been transferred in unloaded condition from the container car 51 to the floor 58 of the platform car 48.

*Delivery of the container*

The transfer from the platform car 48 to the container car 51 or to the marginal area of the loading platforms is performed in approximately the reverse succession. Just as during the receiving operation, the first pair of rollers 49 is first moved onto the edge 56 of the container car and is swung outwardly (rotation of eccentric member). Immediately after it has engaged the opposite car edge, the rolling slide 47 has reached exactly the center of the platform car and container and by the rotation of the axle eccentric is forced against the container bottom 55 together with the wheeled platform frame. The container 53 is lifted and by the divided, simultaneous translatory movement of the wheeled platform 46 and the rolling slide 47 is moved to its end position within the profile of the container car 51, where it is set down. The axle eccentrics have assumed a slightly outwardly directed (semi-extended) position during the transfer movement. The wheeled platform has again been rolled only by a limited distance, the two groups of (two or more) pairs of rollers 49 rolling on the floor of one and the other of the two cars, respectively. To lower the container, the axle eccentrics are swung entirely outwardly (extended position). When the container has been set down, the wheeled platform 46 returns to its initial position in unloaded and partly unsupported condition while the axle eccentrics 50 have swung the pairs of rollers 49 entirely inwardly to the retracted position.

Figure 22:
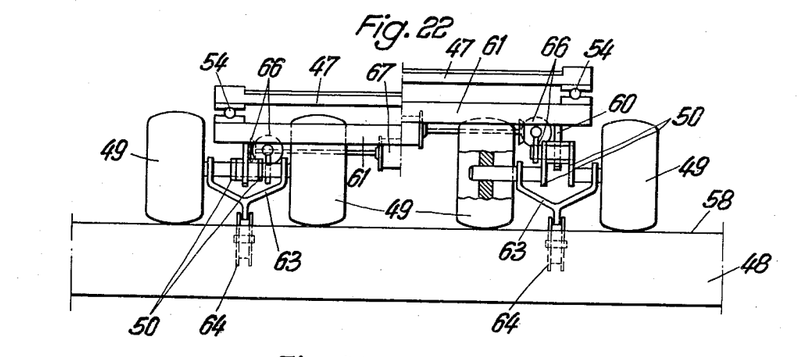
FIG. 22 illustrates details of the wheeled platform partly in an end elevation and partly in a sectional view taken through the running gear of the wheeled platform.
Figure 23:
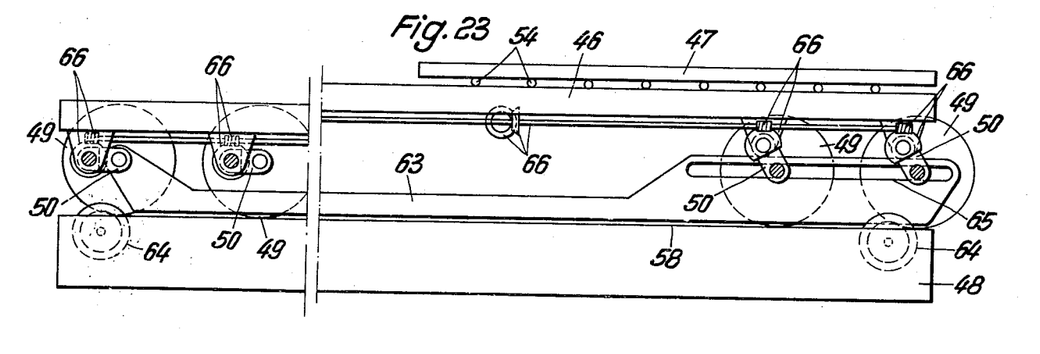
FIG. 23 is a side elevation showing the wheeled platform.

In FIGS. 22 and 23 the wheeled platform of the transfer means is shown in detail whereas the rolling slide and the means for moving the same have not been shown. In the end view shown in FIG. 22 the wheeled platform 46 is shown in the left-hand half in elevation in the lower position and in the right-hand half in transverse section in a raised position. The main parts of the wheeled platform are the top main frame 60 with cross-members 61, which support by means of rollers or balls 54 the relatively slidable rolling slide 57. Numerals 49 designate four eccentrically mounted, rubber-tired pairs of carrying rollers. Numerals 63 designate guide rails, which during the transfer of the pairs of carrying rollers 49 in unsupported and unloaded condition between the inside edges of the cars are guided and supported by the stationary guiding and carrying rollers 64. To enable the rotation of the eccentrics in the opposite direction, the guide rail 63 is guided on the right in an elongated hole 65. FIGS. 22 and 23 show one of the mechanical drives 66 for rotating the eccentric members 50 to swing the pairs of carrying rollers 49 in and out.

The extending and retracting movement of the wheeled platform for transferring the container may also be hydraulically effected with a pusher 67 consisting of a cylinder and a piston or by electromagnetic means.

Figure 24:
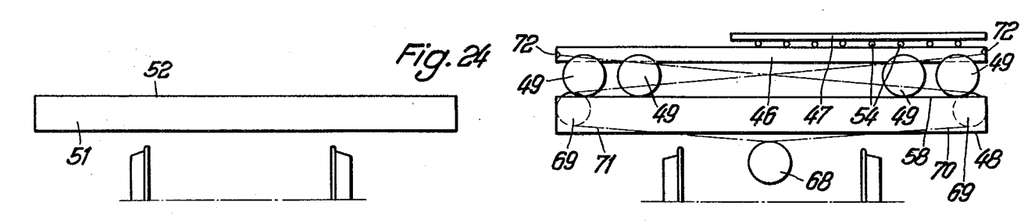
FIGS. 24 to 26 show the drive means for moving the wheeled platform and a roller-supported slide mounted thereon in successive transfer positions.
Figure 25:
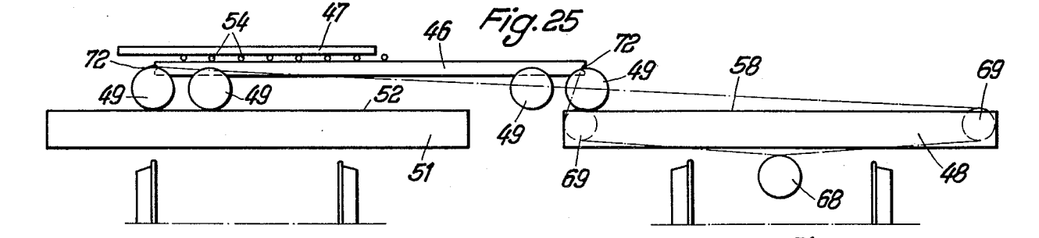
Figure 26:
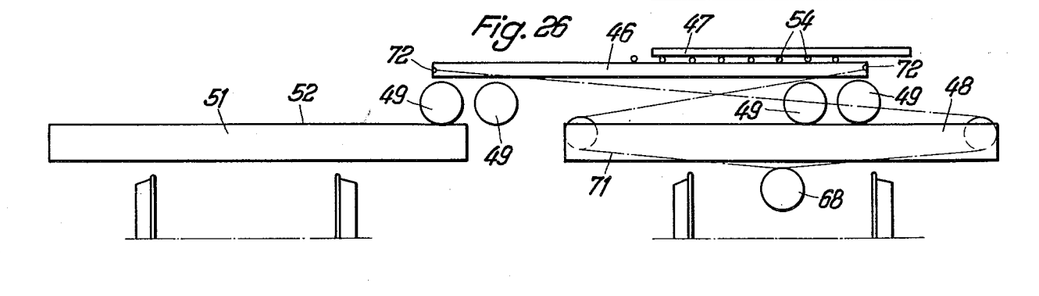

FIGS. 24 to 26 show diagrammatically a rope drive comprising an electric winch 68 and reversing pulleys 69. The symmetrical arrangement of this drive enables the outward movement on both sides without requiring a reversing mechanism. The rope drum designed as a winch with electric gearmotor 68 winds and unwinds the continuous rope 70, 71 at the same time. Thus, the rope extends around the drum only in the number of turns required to transmit the tractive force by adhesive friction. The two rope ends 70, 71 extend from the rope drum 68 and around the reversing pulleys 69 to the respective opposite ends of the platform frame 72 and are secured to the inside thereof. The symmetric rope arrangement is clearly apparent from the FIGS. 24 to 26 showing the wheeled platform in three transfer positions and enables the outward movement of the platform toward both sides, i.e., also to the right.

Figures 27, 28:
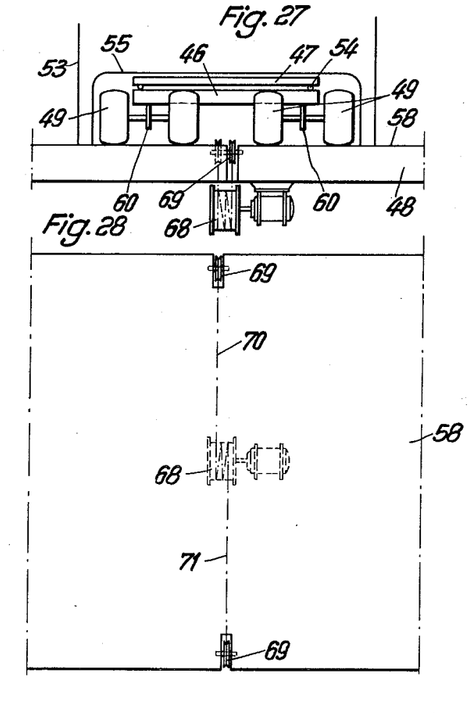
FIG. 27 is an end view of those means for driving the wheeled platform which are carried by a platform car.
FIG. 28 is a top plan view of FIG. 27.

The arrangement of the winch 68 and reversing pulleys 69 is readily apparent in FIG. 26 in an end view and in FIG. 28 in a top plan view.

Figure 29:
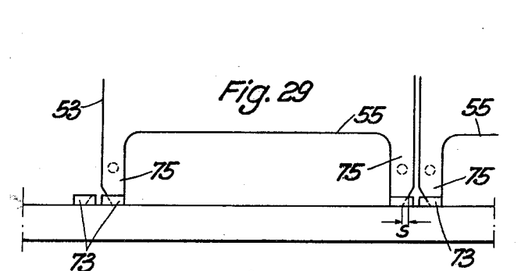
FIG. 29 is a side elevation of a container base and the associated corner-retaining fitting angles.
Figure 30:
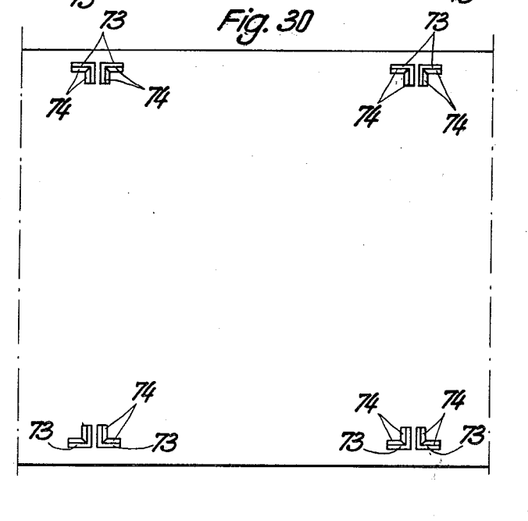
FIG. 30 is a top plan view of FIG. 29.

The corner retaining fitting angles 73 shown in FIGS. 29 and 30 perform a dual function. On the one hand, they anchor and hold the containers or pallets 53 on the container car 51 against undesired slipping and tilting during their transportation on rail. On the other hand, the container or pallets must be re-centered while being lowered after each transverse movement between the platform cars 48 and the container car 51 or between platform cars 48 and the track-side platform area in order to avoid an accumulation of inevitable small position errors. For this reason the corner retaining fitting angles are required and provided not only on the container car 51 but also on the platform cars 48 and in the platform area beside the track. As is apparent from FIG. 29, the inside surfaces 74 of these angles are inwardly and downwardly inclined to mate the similar outside bevel of the four corner feet 75 of the containers or pallets 53. Viewed from all sides the corner feet 75 have the form shown in FIG. 29. Thus, lift transfer devices or individual lift transfer vehicles on the loading platforms, on the road and on all yard and shed areas of the consignors and consignees can move from all four sides below the containers and pallets 53 and transfer them as desired.

This form of the self-supporting and liftable container enables also the use one or narrow-gage railroads for transporting the same because a container may be turned through 90° and transported in the longitudinal direction, where it has a smaller profile.

The arrangement of the corner retaining fitting angles 73 on the four corners of a container position is shown in FIG. 30 in a top plan view for the sake of completeness.

The locking and unlocking of the containers and pallets is shown in FIGS. 31 and 32. The container is automatically locked by interengaging with the spring-loaded angles (FIG. 32) and is unlocked when the transfer means moves below the container (FIG. 31). For this purpose the wheeled platform 46 is formed with runners 76, which are in the position shown in FIG. 31 for unlocking and in the position shown in FIG. 32 for locking. In the position shown in FIG. 31 the runners 76 engage a lever 77, which forms the free arm of a double lever 78. By means of the links 79 the double lever 78 is connected to the locking bars 81, which are guided at 80 in the containers or pallets 53 and in the locking position shown in FIG. 32 are received by the sockets 82 of the corner retaining fitting angles 73 and retained in locking position by springs 83. When a movement of a wheeled platform 46 in the direction of arrow 84 or 85 causes a runner 76 to move from the position of FIG. 32 to the position of FIG. 31, the parts 77, 78, 79, 81 will assume the position shown in FIG. 31, which means that the wheeled platform automatically unlocks the container or pallet 53. Unlocking will also be effected when the runners 76 leave the position of FIG. 31 and assume the position of FIG. 32 because the wheeled platform 46 has been moved in one of the directions 86, 87.

What is claimed is:

1. A method of transferring containers at a railroad station onto a freight train having a plurality of cars, comprising the steps of prearranging containers to be loaded onto the train along an edge of a platform in a row and according to reported spacing of free spacing of cars of the freight train; transferring the prearranged row of containers in transverse direction onto a plurality of transfer means carried by transporting means extending along said edge without changing the spacing of said containers; moving said transporting means in longitudinal direction along said freight train to an aligned position in which said plurality of transfer means are aligned with the free spaces in said cars; and transferring the containers by means of said transfer means in transverse direction directly from said transporting means to said free spaces of said aligned cars while said transporting means are in said aligned position.

2. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along the freight train to align at least one group of containers with the free spaces in cars going to the respective destination; transferring the containers of at least said one group of containers simultaneously in transverse direction from said transporting means onto the free spaces on said aligned cars; transferring from said freight train any containers to be unloaded at said station from said aligned cars onto free spaces on said transporting means; and repeating at least the last three steps only in regard to groups of containers not previously transferred by the previously recited steps until all containers to be loaded on said train have been transferred from said transporting means onto said train and all containers to be unloaded at the station have been transferred from said train to said transporting means.

3. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along the freight train to align at least one group of containers with the free spaces in cars going to the respective destination; transferring the containers of at least said one group of containers simultaneously in transverse direction from said transporting means onto the free spaces on said aligned cars; transferring from said freight train any containers to be unloaded at said station from said aligned cars onto free spaces on said transporting means; repeating at least the preceding three steps only in regard to groups of containers not previously transferred by the previously recited steps until all containers to be loaded on said train have been transferred from said transporting means onto said train and all containers to be unloaded at the station have been transferred from said train to said transporting means; moving said transporting means in longitudinal direction back to said platform; and unloading the containers from said transporting means onto said platform.

4. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along the freight train to align at least one group of containers with the free spaces in cars going to the respective destination; transferring the containers of at least said one group of containers simultaneously in transverse direction from said transporting means onto the free spaces on said aligned cars; transferring from said freight train any containers to be unloaded at said station from said aligned cars onto free spaces on said transporting means; repeating at least the preceding three steps only in regard to groups of containers not previously transferred by the previously recited steps until all containers to be loaded on said train have been transferred from said transporting means onto said train and all containers to be unloaded at the station have been transferred from said train to said transporting means; moving said transporting means in longitudinal direction back to said platform; and unloading the container from said transporting means onto said platform while shifting said transporting means relative to said platform to arrange said containers on said platform in groups according to different destinations to which said containers are to be further transported from said station.

5. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along the freight train to align at least one group of containers with the free spaces in cars going to the respective destination; transferring the containers of at least said one group of containers simultaneously in transverse direction from said transporting means onto the free spaces on said aligned cars; simultaneously transferring from said aligned cars any containers to be unloaded therefrom at the station and additional containers originally loaded in cars of the freight train going to different destinations than those to which these additional containers are to be shipped onto any free spaces on said transporting means without moving said transporting means relative to said freight train; shifting said transporting means in longitudinal direction relative to said freight train between a plurality of positions to align said additional containers on said transporting means with empty spaces on cars going to destinations to which said additional containers have to be transported and to align empty spaces on said transporting means with containers to be unloaded from said train at said station; and transferring in each of said shifted positions said additional containers aligned with empty spaces on the cars going to destinations to which the respective additional container is to be transported to said empty space on the car of the freight train and from said freight train any containers to be unloaded at the station to empty spaces on said transporting means.

6. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along one side of the freight train to align at least one group of containers with the free spaces in cars going to the respective destination; transferring the containers of at least said one group of containers simultaneously in transverse direction from said transporting means onto the free spaces on said aligned cars; moving a second transporting means along the other side of said freight train; and transferring from cars of said freight train containers to be unloaded at said station in transverse direction onto said second transporting means while containers from said first transporting means are loaded onto cars of said freight trains.

7. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along one side of the freight train to align at least one group of containers with the free spaces in cars going to the respective destination; transferring the containers of at least said one group of containers simultaneously in transverse direction from said transporting means onto the free spaces on said aligned cars; moving a second transporting means along the other side of said freight train; transferring from cars of said freight train containers to be unloaded at said station in transverse direction onto said second transporting means while containers from said first transporting means are loaded onto cars of said freight trains; and shifting said second transporting means along said other side of said freight train in such a manner to load the containers transferred on said second transporting means in subsequent groups according to different destinations to which said containers are to be further transported from said station.

8. A method of transferring containers at a railroad station on and from a freight train having a plurality of cars going to different destinations, comprising the steps of prearranging containers to be loaded onto the train along an edge of a platform in a row and in a sequence of groups according to their destination with the containers in each group spaced from each other according to reported spacing of free spaces on the cars going to the respective destinations; transferring the prearranged row of containers in transverse direction onto transporting means extending along said edge without changing the sequence and spacing of said containers; moving said transporting means in longitudinal direction along the freight train to align at least one group of containers with the free spaces in cars going to the respective destination; transferring the containers of at least said one group of containers simultaneously in transverse direction from said transporting means onto the free spaces on said aligned cars; transferring from said freight train any containers to be unloaded at said station from said aligned cars onto free spaces on said transporting means; repeating at least the preceding three steps only in regard to groups of containers not previously transferred by the previously recited steps until all containers to be loaded on said train have been transferred from said transporting means onto said train and all containers to be unloaded at the station have been transferred from said train to said transporting means; moving said transporting means in longitudinal direction back to said platform; unloading the containers from said transporting means onto said platform while shifting said transporting means relative to said platform to arrange said containers on said platform in groups according to different destinations to which said containers are to be further transported from said station; and transferring said groups of containers on said platform to trucks for shipment to further destinations.

9. A method of transferring a plurality of containers from one to another freight train comprising the steps of moving elongated transporting means having a plurality of transfer spaces arranged thereon respectively spaced from each other according to the spacing of transport spaces on said other freight train into a position along said one freight train in which at least one of said transfer spaces is located directly opposite at least one of said plurality of containers to be transferred from said one freight train; moving at least said one container from said one train in transverse direction directly onto the transfer space of said transporting means located directly opposite thereto; shifting said elongated transporting means, after transfer of at least said one container, in longitudinal direction until another transfer space on said transporting means which is spaced from said one transfer space according to a reported spacing of empty transport spaces on said other freight train is located opposite another container of said plurality of containers on said one freight train; moving said other container in transverse direction directly onto said other transfer space located directly opposite thereto and repeating the aforementioned steps until all containers to be transferred from said one to said other freight train are located on transfer spaces of said transporting means spaced from each other according to the reported spacing of empty transport spaces on said other freight train; moving said transporting means longitudinally along said other freight train to a position in which the containers on the transfer spaces thereon are aligned with the empty transport spaces on said other freight train; and transferring the containers from said transfer spaces on said transporting means in transverse direction directly onto the corresponding empty transport spaces on said other freight train without moving said transporting means and said other freight train relative to each other.

References Cited by the Examiner
UNITED STATES PATENTS

| | | | |
|---|---|---|---|
| 1,040,229 | 10/12 | McCune | 214—38.8 X |
| 1,535,203 | 4/25 | Cook | 214—38.8 X |
| 1,783,363 | 12/30 | Grob | 214—38.8 X |
| 1,944,771 | 1/34 | Webb et al. | 214—152 |
| 1,971,339 | 8/34 | Fitch | 214—38 |
| 2,081,178 | 5/37 | Kullerstrand | 214—38 |
| 2,096,958 | 10/37 | Clerc | 214—16.42 X |
| 2,107,292 | 2/38 | Fitch | 214—38.42 |
| 2,146,436 | 2/39 | Lima | 214—38.8 X |
| 2,447,559 | 8/48 | Bloemers | 214—152 |

HUGO O. SCHULZ, *Primary Examiner.*

GERALD M. FORLENZA, *Examiner.*